US010720954B2

(12) United States Patent
Doyle et al.

(10) Patent No.: US 10,720,954 B2
(45) Date of Patent: Jul. 21, 2020

(54) SYSTEM AND METHOD TO SHARE SINGLE ANTENNA BETWEEN TWO L-BAND RECEIVER/TRANSMITTERS

(71) Applicant: Honeywell International Inc., Morris Plains, NJ (US)

(72) Inventors: Robert S. Doyle, Peoria, AZ (US); Steven D. Neuharth, Coeur D'alene, ID (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/359,274

(22) Filed: Mar. 20, 2019

(65) Prior Publication Data

US 2020/0162121 A1 May 21, 2020

Related U.S. Application Data

(60) Provisional application No. 62/769,861, filed on Nov. 20, 2018.

(51) Int. Cl.
*H04B 1/44* (2006.01)
*H04B 1/00* (2006.01)
*H04B 1/16* (2006.01)

(52) U.S. Cl.
CPC ............. *H04B 1/44* (2013.01); *H04B 1/006* (2013.01); *H04B 1/1615* (2013.01)

(58) Field of Classification Search
CPC ......... H04B 1/44; H04B 1/1615; H04B 1/006
USPC ....................... 375/262; 455/426.1
See application file for complete search history.

(56) References Cited

U.S. PATENT DOCUMENTS

| 5,212,813 | A |   | 5/1993 | Renaud |
|---|---|---|---|---|
| 5,652,589 | A | * | 7/1997 | Ono .................. G01S 13/345 342/70 |
| 5,915,212 | A | * | 6/1999 | Przelomiec ............ H04B 1/52 455/426.1 |
| 7,525,474 | B2 |   | 4/2009 | Carocari et al. |

(Continued)

OTHER PUBLICATIONS

European Patent Office, "Partial European Search Report from EP Application No. 19208416.8", from Foreign counterpart to U.S. Appl. No. 16/359,274, dated Apr. 17, 2020, pp. 1 through 14, Published: EP.

*Primary Examiner* — Fitwi Y Hailegiorgis
(74) *Attorney, Agent, or Firm* — Fogg & Powers LLC

(57) ABSTRACT

An antenna switching system comprises an antenna switch module comprising a switch network that includes RF switches connectable to signal receive and transmit paths, and a switch control unit. First and second receiver/transmitter units are connected to the antenna switch module. A single antenna is connected to the receiver/transmitter units through the antenna switch module. The switch control unit receives mutual suppression signal pulses routed from the receiver/transmitter units. The mutual suppression signal pulses are decoded by the switch control unit to generate control signals to open and close the RF switches as needed for a signal transmit operation mode or a signal receive operation mode. The signal transmit operation mode comprises a first transmit mode in which either of the receiver/transmitter units transmits RF signals along the transmit path, or a second transmit mode in which both of the receiver/transmitter units transmit RF signals along the transmit path.

19 Claims, 8 Drawing Sheets

(56) References Cited

U.S. PATENT DOCUMENTS

2010/0227570 A1    9/2010   Hendin
2015/0326326 A1   11/2015   Nobbe et al.
2017/0271755 A1    9/2017   Troxel

* cited by examiner

SYSTEM AND METHOD TO SHARE SINGLE ANTENNA BETWEEN TWO L-BAND RECEIVER/TRANSMITTERS

CROSS REFERENCE TO RELATED APPLICATION

This application claims the benefit of priority to U.S. Provisional Application No. 62/769,861, filed on Nov. 20, 2018, which is herein incorporated by reference.

BACKGROUND

In conventional aircraft installations, each radio requires a separate antenna. Thus, when two or more radios are installed in an aircraft, two or more separate antennas for the radios are needed. In some aircraft such as helicopters, merely locating an additional antenna is a challenge.

Each aircraft installation seeks to minimize the number of radio antennas for many reasons, including cost, weight, drag, holes in fuselage, or the like. Accordingly, there is a need for providing a way to utilize a single antenna in aircraft.

SUMMARY

An antenna switching system comprises an antenna switch module comprising a switch network that includes a plurality of radio frequency (RF) switches connectable to a signal receive path and a signal transmit path, and a switch control unit in operative communication with the switch network. A first receiver/transmitter unit is operatively connected to the antenna switch module, and a second receiver/transmitter unit is operatively connected to the antenna switch module. A single antenna is operatively connected to the first receiver/transmitter unit and the second receiver/transmitter unit through the antenna switch module. The switch control unit is operative to receive mutual suppression signal pulses routed from the first receiver/transmitter unit and the second receiver/transmitter unit. The mutual suppression signal pulses are decoded by the switch control unit to generate control signals to open and close the RF switches as needed for a signal transmit operation mode or a signal receive operation mode. The signal transmit operation mode comprises: a first transmit mode in which either the first or second receiver/transmitter units is configured to transmit RF signals along the signal transmit path; or a second transmit mode in which both the first and second receiver/transmitter units are configured to transmit RF signals along the signal transmit path.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for sharing a single antenna between two receiver/transmitters is described herein. The system generally includes an antenna switch module having an antenna switch network. The antenna switch module can be implemented as an external line replaceable unit, and allows two L-band receiver/transmitter (RT) units to share a single antenna.

On the receive side, the antenna switch module splits the received signal and routes the received signal to both L-band RT units. An optional low noise amplifier can be employed to mitigate loss (e.g., about 3 dB loss) associated with use of a splitter for the received signal. On the transmit side, the antenna switch module cannot sum the two transmitter outputs to the antenna without incurring a combiner loss (e.g., about 3 dB loss), which power loss is unacceptable. Instead, the antenna switch module switches between the two transmitters of the RT units.

The antenna switch module monitors the mutual suppression signal originating from the two RT units. Prior to a RT unit transmitting, the RT unit will assert the mutual suppression signal that will suppress the receivers of all the L-band systems on a vehicle such as an aircraft. The antenna switch module uses the suppression signal to select between the two RT units.

The present system and method allow two radios in a vehicle such as an aircraft to share a single antenna. For example, an aircraft that includes two L-band transceiver navigation radios can share the same antenna.

In an exemplary implementation, an aircraft that includes both a Distance Measuring Equipment (DME) radio and a Tactical Air Navigation (TACAN) radio can share a single antenna by using the present system. The DME/TACAN receiver/transmitters output a mutual suppression pulse that brackets their transmit pulses so that other L-band equipment on the aircraft can mute their receivers and prevent overload. The mutual suppression pulses are used to drive the antenna switch network, which can be a separate line replaceable unit mounted near the antenna on the aircraft. In addition, the present system can be operated using aircraft power on the order of only a few watts.

The present approach reduces installation costs and complexity by eliminating an additional L-band antenna typically required to support two radios. In addition, the present method minimizes the holes needed in an aircraft fuselage, as only one antenna is needed for two radios.

Further details of various embodiments are described hereafter with reference to the drawings.

Figure 1A:
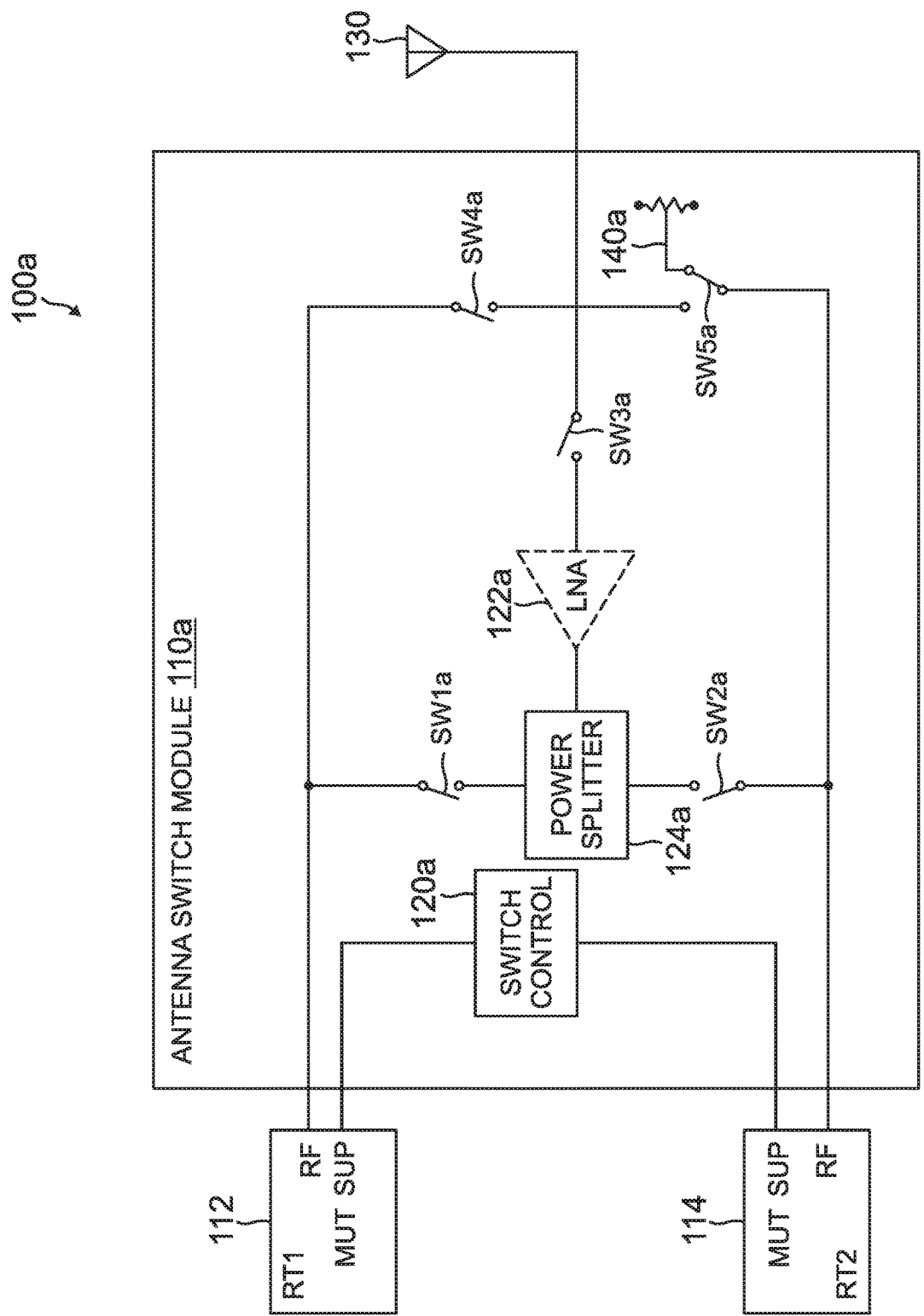
FIG. 1A is a schematic diagram of an antenna switching system, according to one embodiment.

FIG. 1A illustrates an antenna switching system 100a, according to one embodiment. The antenna switching system 100a includes a switch network in an antenna switch module 110a. The switch network includes a plurality of radio frequency (RF) switches. A first set of RF switches is located along a signal receive path and includes a first RF switch SW1a, a second RF switch SW2a, and a third RF switch SW3a. A second set of RF switches is located along a signal transmit path and includes a fourth RF switch SW4a and a fifth RF switch SW5a. The RF switches can be PIN diodes or monolithic microwave integrated circuit (MMIC) switches, in combination with limiters and transmission lines.

The antenna switch module 110a is operatively coupled with a first receiver/transmitter unit 112 (RT1) and a second receiver/transmitter unit 114 (RT2). The antenna switch module 110a is also operatively coupled to a single antenna 130. The switch network in antenna switch module 110a allows the first and second receiver/transmitters 112, 114 to share single antenna 130.

A switch control unit 120a in antenna switch module 110a is operative to receive mutual suppression (MUT SUP) signal pulses routed from the first and second receiver/transmitter units 112, 114. The mutual suppression signal pulses are decoded by switch control unit 120a to generate control signals for each of the RF switches. The switch control unit 120a can be implemented with hardware such as flip-flops, for example.

An optional low noise amplifier (LNA) 122a in antenna switch module 110a is located along a signal receive path and is configured to receive a signal from antenna 130 through RF switch SW3a. A power splitter 124a in antenna switch module 110a is located along the signal receive path and is coupled between an output of LNA 122a (when used) and RF switches SW1a and SW2a.

The RF switch SW4a is located along a signal transmission path between first receiver/transmitter unit 112 and antenna 130. The RF switch SW5a is located along a signal transmission path between second receiver/transmitter unit 114 and antenna 130. When the second receiver/transmitter unit 114 is not connected to antenna 130, receiver/transmitter unit 114 is connected to a dummy load 140a by RF switch SW5a. In another embodiment, when the first receiver/transmitter unit 112 is not connected to antenna 130, receiver/transmitter unit 112 can be connected to another dummy load by RF switch SW4a.

As shown in FIG. 1A, the first, second, third, and fourth RF switches are single-pole-single-throw (SPST) switches, and the fifth RF switch is a single-pole-double-throw (SPDT) switch.

Figure 1B:
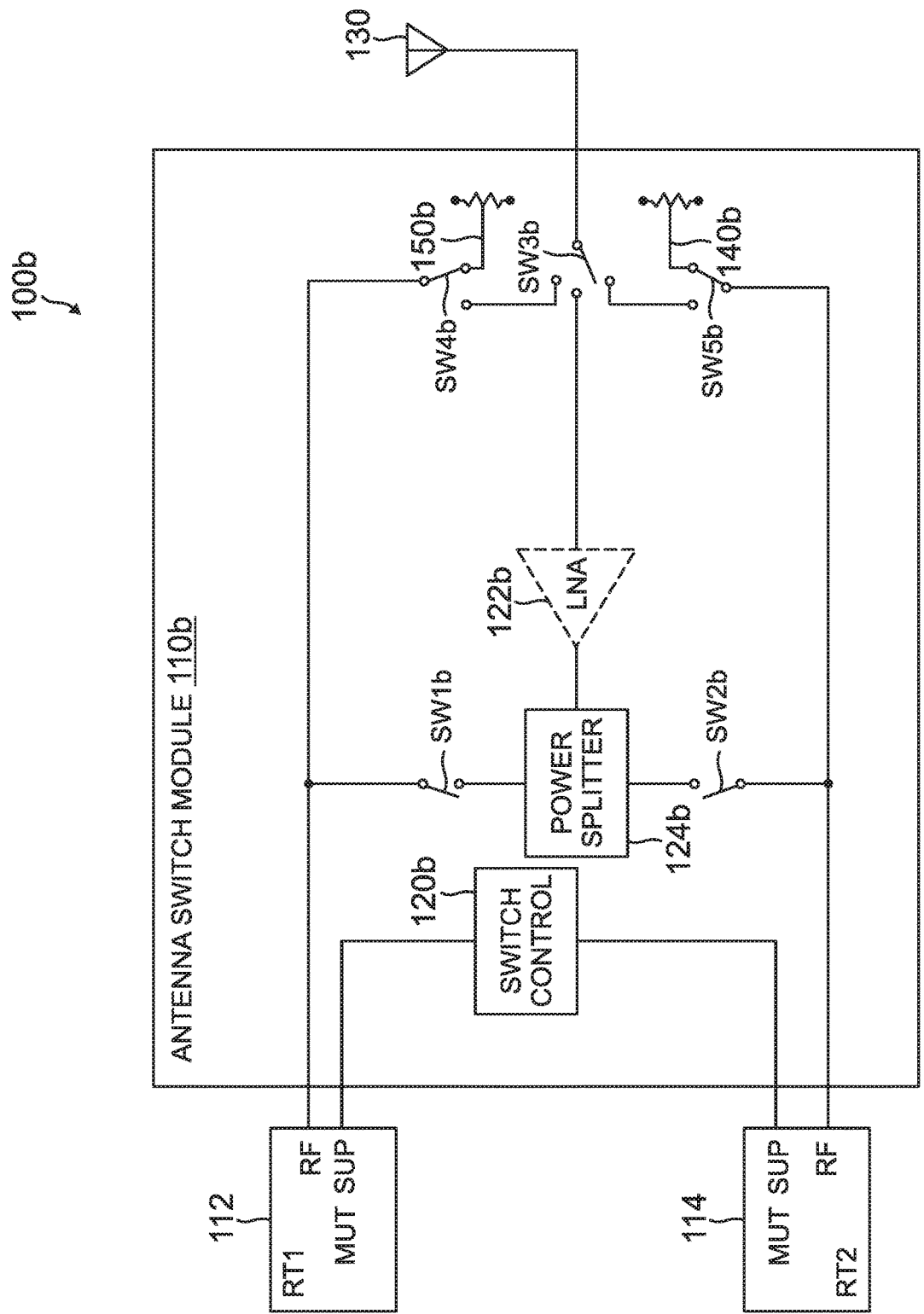
FIG. 1B is a schematic diagram of an antenna switching system, according to an alternative embodiment.

In an alternative embodiment, illustrated in FIG. 1B, an antenna switching system 100b has the third, fourth, and fifth RF switches (SW3b, SW4b, SW5b) implemented as part of a single-pole-three-throw (SPTT) switching system. This allows antenna 130 to be connected to a power splitter 124b (through optional LNA 122b when used), or to the first receiver/transmitter unit 112 or the second receiver/transmitter unit 114 using the SPTT switch. The switch network of antenna switching system 100b also includes switch control unit 120b, which is operative to receive mutual suppression signal pulses routed from the first and second receiver/transmitter units 112, 114. The optional LNA 122b is located along the signal receive path, and power splitter 124b is coupled to an output of LNA 122b.

The switch network in antenna switch module 110b also includes a first set of RF switches located along the signal receive path, including RF switch SW1b and RF switch SW2b, which are implemented as SPST switches. A second set of RF switches is located along the signal transmit path and includes RF switch SW4b and RF switch SW5b, which are implemented as SPDT switches. The RF switch SW3b is implemented as an SPTT switch, such that antenna 130 can be connected to LNA 122, or to the first receiver/transmitter unit 112 through RF switches SW3b and SW4b, or to the second receiver/transmitter unit 114 through RF switches SW3b and SW5b.

When receiver/transmitter unit 114 is not connected to antenna 130, receiver/transmitter unit 114 is connected to a first dummy load 140b by RF switch SW5b. When receiver/transmitter unit 112 is not connected to antenna 130, receiver/transmitter unit 112 is connected to a second dummy load 150b by RF switch SW4b.

Figure 1C:
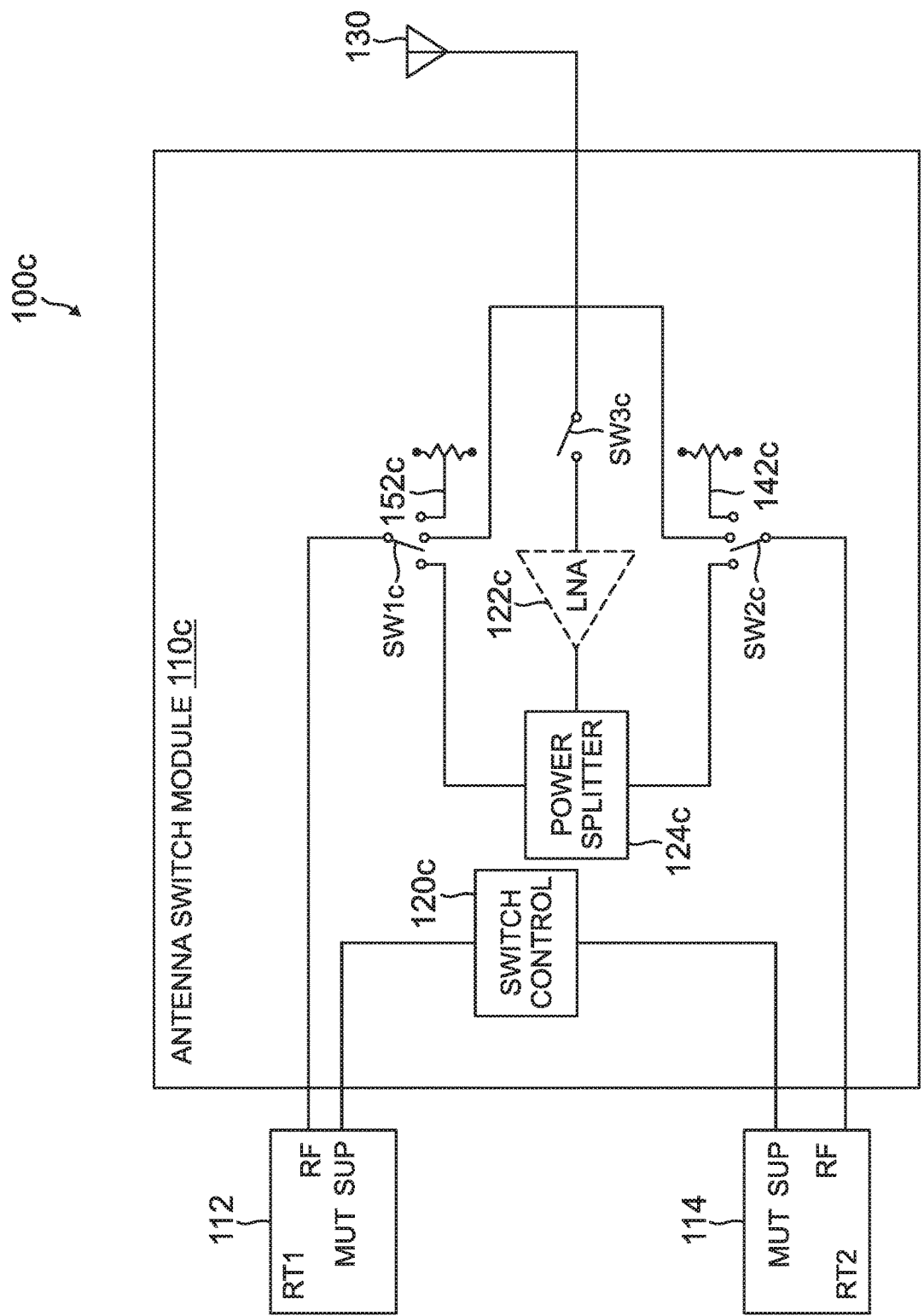
FIG. 1C is a schematic diagram of an antenna switching system, according to another alternative embodiment.

In another alternative embodiment, the second and fifth RF switches of the previous embodiments can be combined and implemented as a SPTT switch, and the first and fourth RF switches can be combined and implemented as another SPTT switch. Such an embodiment is illustrated in FIG. 1C, which depicts an antenna switching system 100c that includes a switch network in an antenna switch module 110c, which also includes a switch control unit 120c, an optional LNA 122c, and a power splitter 124c.

The switch network in antenna switch module 110c includes a plurality of RF switches, including a first RF switch SW1c and a second RF switch SW2c, which are SPTT switches. An RF switch SW3c allows antenna 130 to be connected to power splitter 124c through optional LNA 122c. The RF switch SW1c is implemented as an SPTT switch such that receiver/transmitter unit 112 can be connected to power splitter 124c during a receive mode, or to a dummy load 152c as needed, or to antenna 130 during a transmit mode. The RF switch SW2c is also implemented as an SPTT switch such that receiver/transmitter unit 114 can be connected to power splitter 124c during a receive mode, or to a dummy load 142c as needed, or to antenna 130 during a transmit mode.

When receiver/transmitter unit 114 is not connected to antenna 130, receiver/transmitter unit 114 is connected to dummy load 142c by RF switch SW2c. When receiver/transmitter unit 112 is not connected to antenna 130, receiver/transmitter unit 112 is connected to dummy load 152c by RF switch SW1c.

In one implementation, the antenna switch module can be implemented as an external antenna switch line replaceable unit (LRU) that includes three RF connectors: an L-band antenna connector, an RF connector to an RT1 antenna connector, and a RF connector to an RT2 antenna connector. The antenna switch LRU is an active device. A separate connector provides power (e.g., +28 VDC power) and requires separate connections to an RT1 and RT2 suppression bus, which is used to arbitrate access between the RT units and the antenna.

The antenna switch modes for operation of the antenna switching system are summarized in Table 1 as follows. The suppression signals provided by the RT1 and RT2 units have four states, which are listed in Table 1.

TABLE 1

Antenna Switch Modes

| RT1 Unit | RT2 Unit | Operation |
| --- | --- | --- |
| Receive | Receive | The antenna signal is amplified by low noise amplifier, split into two paths, and provided to both the RT1 and RT2 units |
| Receive | Transmit | RT2 unit is transmitting and RT1 unit is receiving |
| Transmit | Receive | RT1 unit is transmitting and RT2 unit is receiving |
| Transmit | Transmit | Both RT units are transmitting simultaneously |

Figure 2:
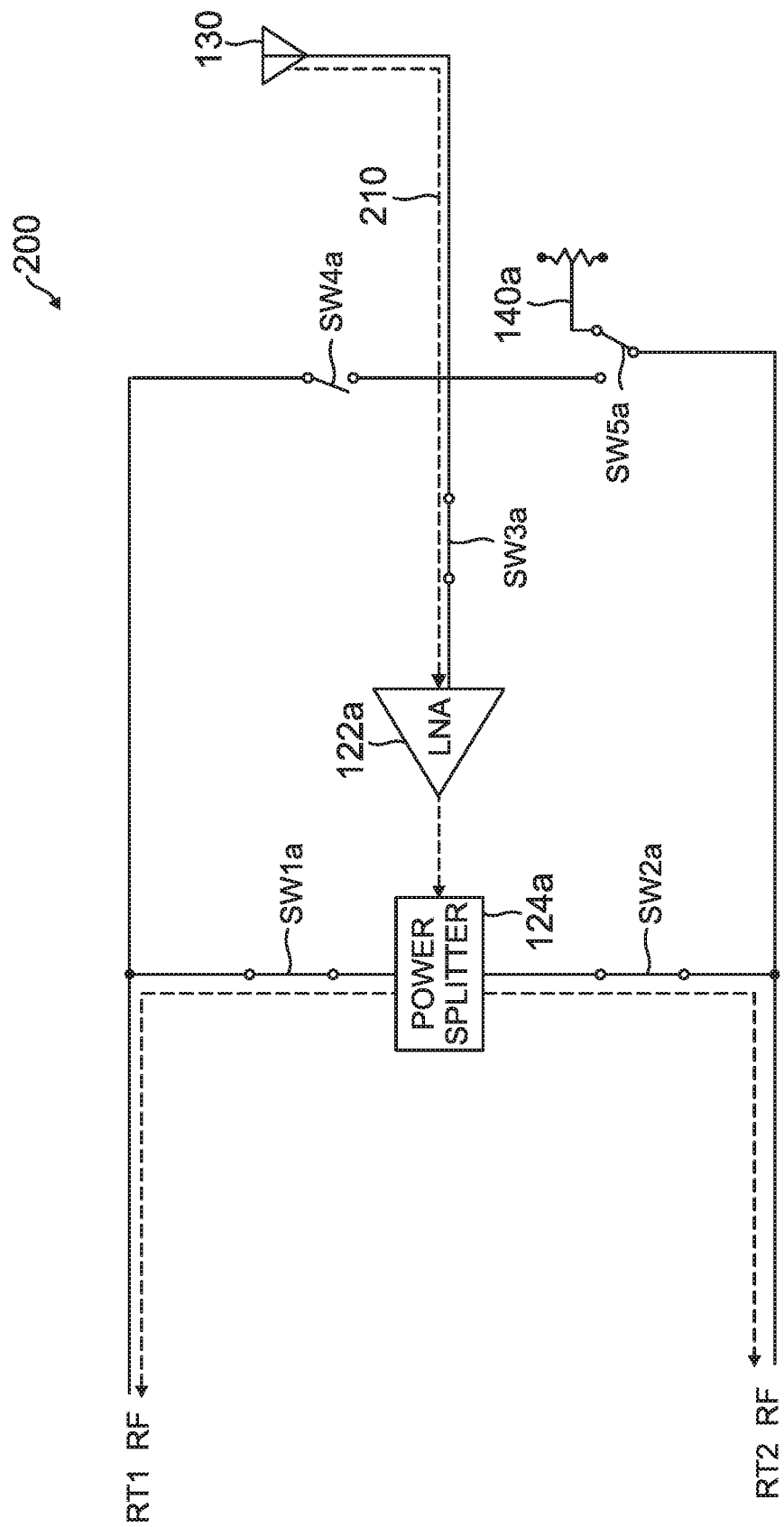
FIG. 2 is a schematic diagram of a receive operation mode for the antenna switching system of FIG. 1A.

In a receive operation mode 200, which is illustrated in FIG. 2 (for antenna switching system 100a), an antenna RF signal 210 from antenna 130 passes through RF switch SW3a, is amplified by low noise amplifier 122a, is split into two paths by power splitter 124a, passes through RF switches SW1a and SW2a, and is sent to both the RT1 and RT2 units. In this mode, neither of the RT units are transmitting and the received signals are routed from antenna 130 to the receivers in both RT units. The receive path contains the low noise amplifier to preserve the noise figure in the presence of the additional switch and power splitter loss.

Figure 3:
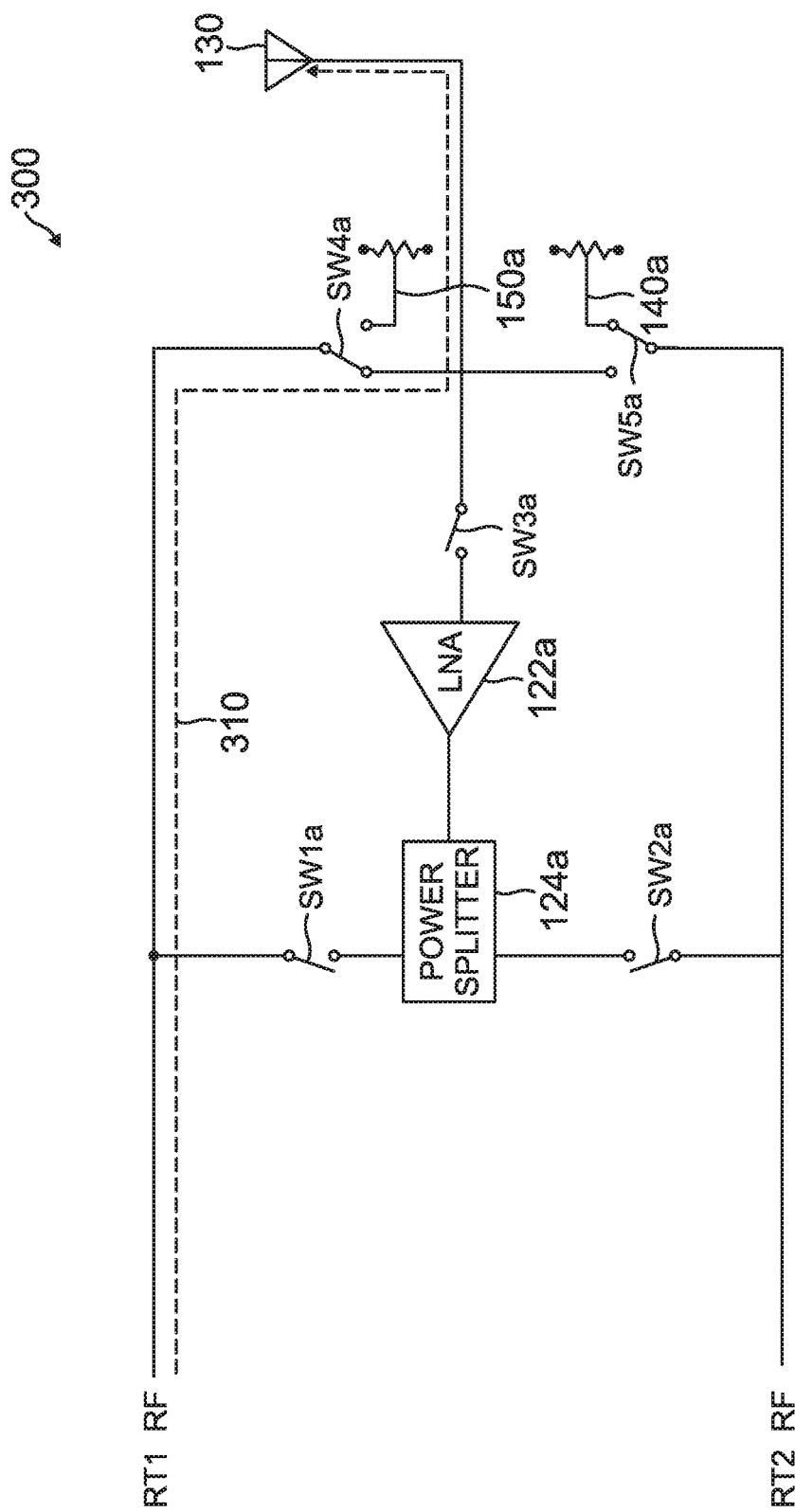
FIG. 3 is a schematic diagram of a first transmit operation mode for the antenna switching system of FIG. 1A.

In one transmit operation mode 300 for the RT1 unit, which is illustrated in FIG. 3, the RT1 unit is transmitting an RF signal 310 to antenna 130 through RF switch SW4a, and the RT2 unit is disconnected from antenna 130 by RF switch SW5a. As shown in FIG. 3, both of RF switches SW4a and SW5a are implemented as SPDT switches connectable to respective dummy loads 150a and 140a.

Figure 4:
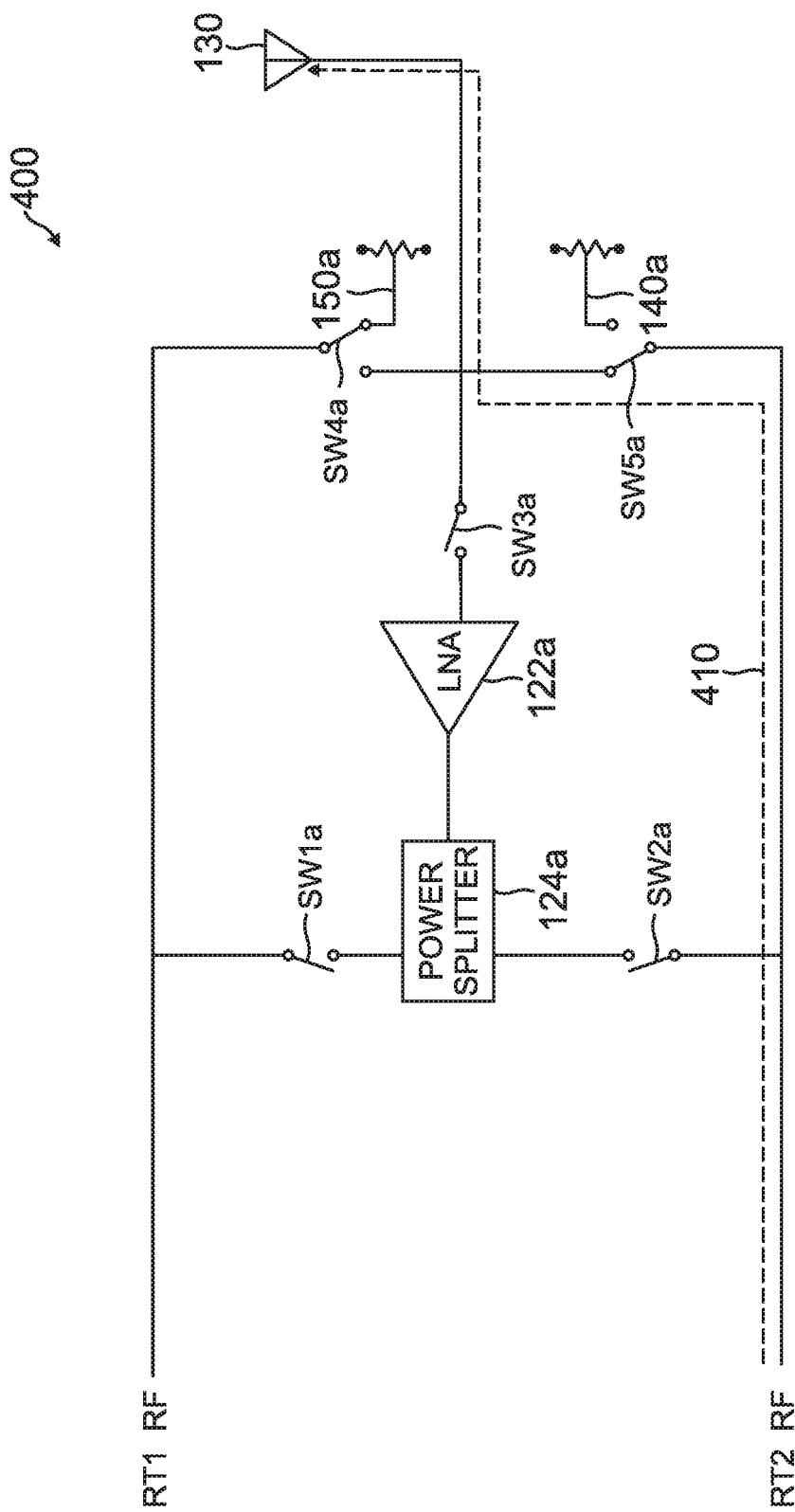
FIG. 4 is a schematic diagram of a second transmit operation mode for the antenna switching system of FIG. 1A.

In another transmit operation mode 400 for the RT2 unit, which is illustrated in FIG. 4, the RT2 unit is transmitting an RF signal 410 to antenna 130 through switch SW5a, and the RT1 unit is disconnected from antenna 130 by RF switch SW4a. As shown in FIG. 4, both of RF switches SW4a and SW5a are again implemented as SPDT switches connectable to respective dummy loads 150a and 140a.

In a simultaneous transmit operation mode, both of the RT1 and RT2 units are transmitting respective RF signals. In this condition, one of the transmitters in the RT1 and RT2 units needs to be routed to a dummy load, as there is no way to share the antenna. There are two approaches for handling this condition.

Figure 5A:
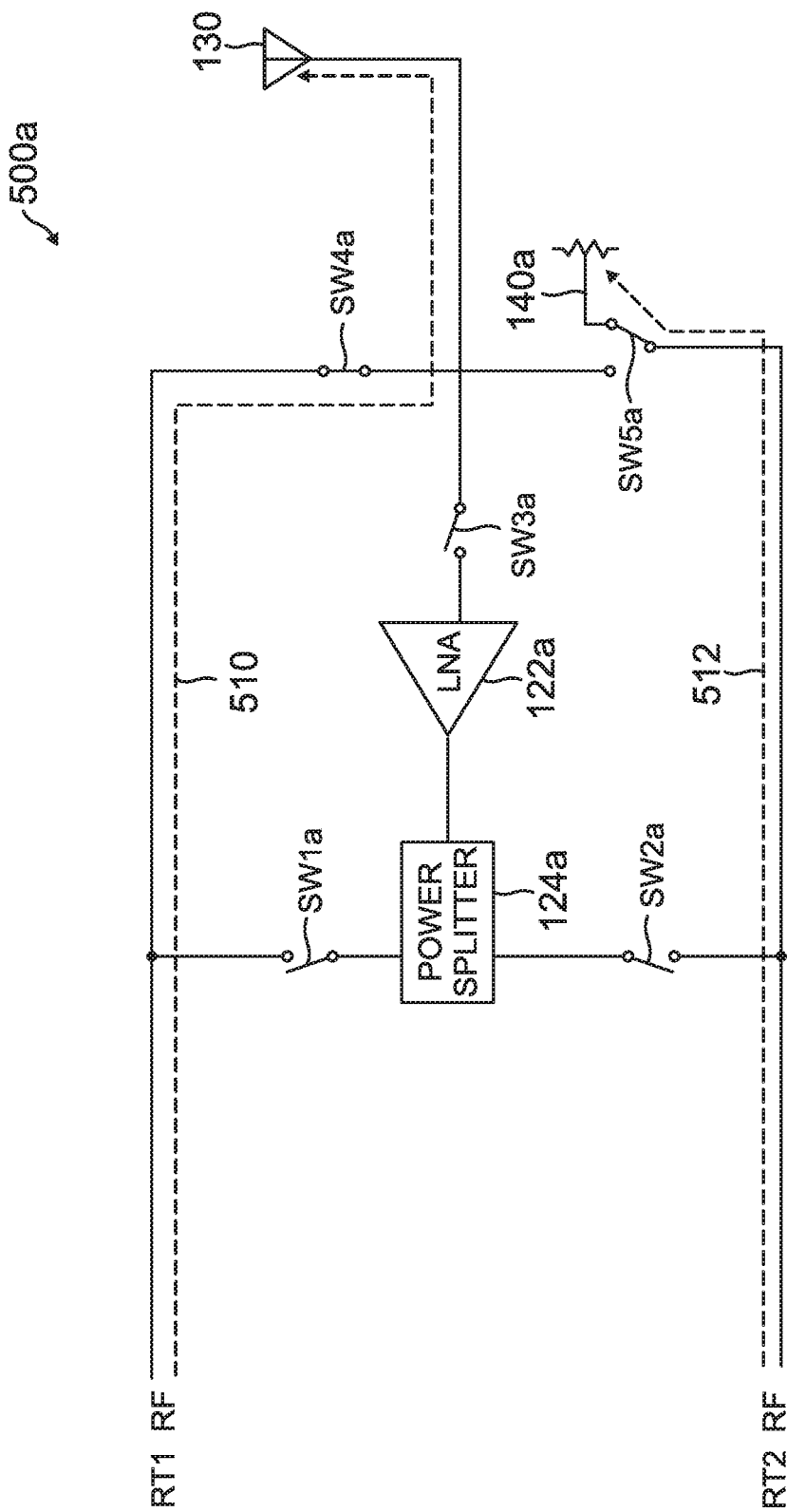
FIGS. 5A and 5B are schematic diagrams of alternative simultaneous transmit operation modes for the antenna switching system of FIG. 1A.

In a first approach 500a, shown in FIG. 5A, the RT1 unit is given priority and connects to antenna 130 through RF switch SW4a any time the RT1 unit intends to transmit an RF signal 510, even if the RT2 unit is currently transmitting an RF signal 512. When the RT2 unit is not connected to antenna 130, the RT2 unit is connected to dummy load 140a through RF switch SW5a to prevent damage to the transmitter of the RT2 unit. The first approach simplifies the hardware since only one SPDT switch and one dummy load is required. However, this approach does have some drawbacks. If the RT2 unit is transmitting and the RT1 unit begins transmitting, the output of the RT2 unit will be "hot switched" between the antenna and the dummy load. This may create a momentary case where the RT2 transmitter is unloaded. If the RT2 unit is transmitting and the RT1 unit begins transmitting, interrogations from the RT1 and RT2 units will both be garbled. This wastes transmitter power and adversely affects interrogation efficiency.

Figure 5B:
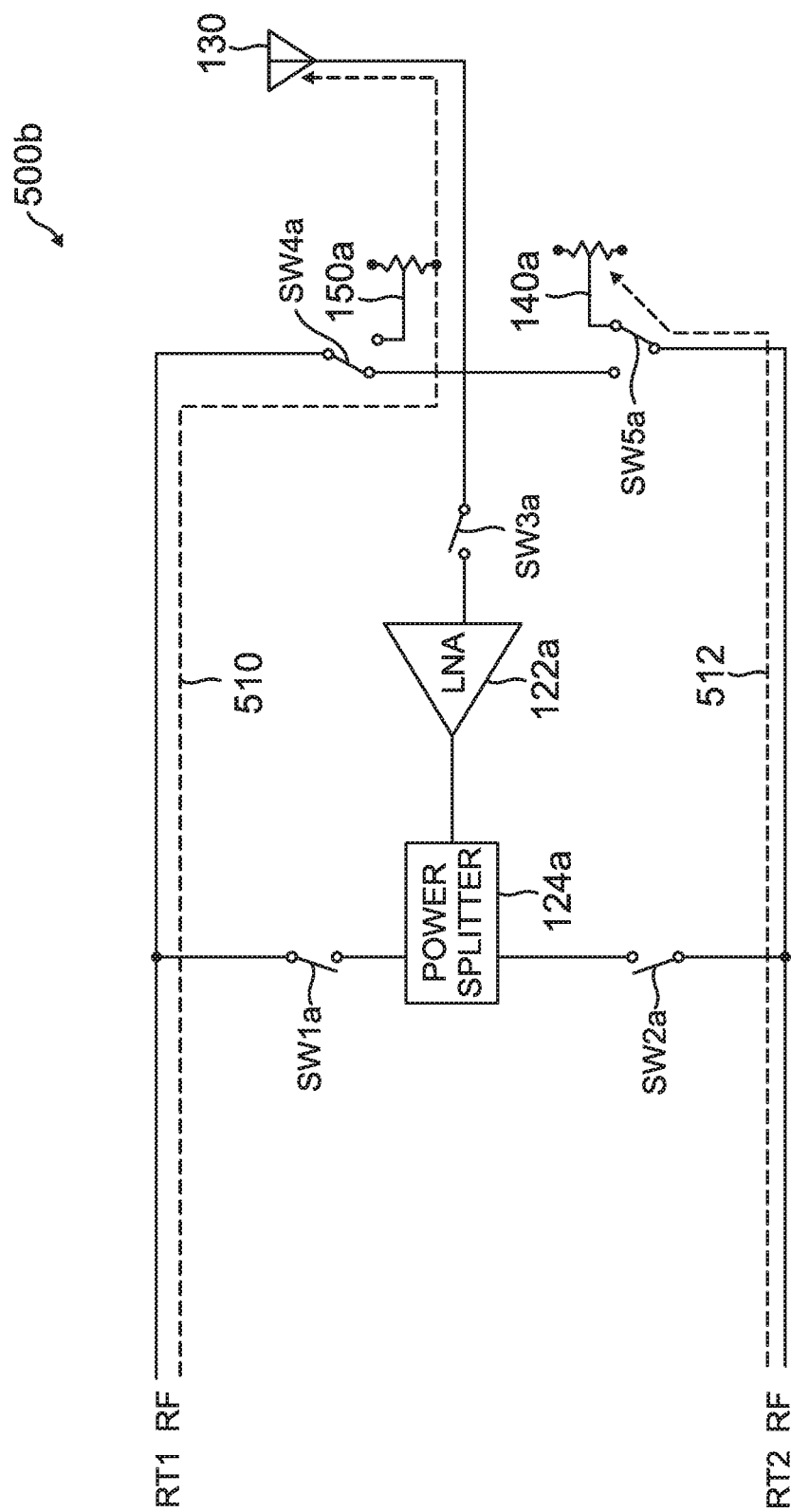

In a second approach, shown in FIG. 5B, priority is given to whichever RT unit asserts mutual suppression first. As shown, the RT1 unit is given priority and connects to antenna 130 through RF switch SW4a to transmit RF signal 510, while the RT2 unit transmitting RF signal 512 is not connected to antenna 130, but instead is connected to dummy load 140a through RF switch SW5a. While this eliminates the drawbacks of the first approach, the second approach requires that RF switches SW4a and SW5a be SPDT switches that are respectively connectable to two dummy loads (150a and 140a).

Returning to FIG. 1B, in one transmit operation mode for the RT1 unit 112 in antenna switching system 100b, the RT1 unit 112 transmits an RF signal to antenna 130 through RF switch SW4b and RF switch SW3b, which are both connected to the signal transmit path. In another transmit operation mode, the RT2 unit 114 transmits an RF signal to antenna 130 through the RF switch SW5b and RF switch SW3b, which are both connected to the signal transmit path. In a further transmit operation mode, in which both of the RT1 and RT2 units 112 and 114 transmit RF signals along the signal transmit path, the RF signal from one of the RT1 or RT2 units is routed to the respective dummy load 140b or 150b, while the other RF signal is routed to antenna 130.

In a receive operation mode for antenna switching system 100b, an RF signal from antenna 130 passes through RF switch SW3b, is amplified by low noise amplifier 122b, is split into two paths by power splitter 124b, passes through RF switches SW1b and SW2b, and is sent to both the RT1 and RT2 units 112 and 114. In this mode, neither of the RT units are transmitting and the received signals are routed from antenna 130 to the receivers in both RT units.

Returning to FIG. 1C, in one transmit operation mode for the RT1 unit 112 in antenna switching system 100c, the RT1 unit 112 transmits an RF signal to antenna 130 through RF switch SW1c that is connected to the signal transmit path. In another transmit operation mode, the RT2 unit 114 transmits an RF signal to antenna 130 through the RF switch SW2c that is connected to the signal transmit path. In a further transmit operation mode, in which both of the RT1 and RT2 units 112 and 114 transmit RF signals along the signal transmit path, the RF signal from one of the RT1 or RT2 units is routed to the respective dummy load 142c or 152c, while the other RF signal is routed to antenna 130.

In a receive operation mode for antenna switching system 100c, an RF signal from antenna 130 passes through RF switch SW3c, is amplified by low noise amplifier 122c, is split into two paths by power splitter 124c, passes through RF switches SW1c and SW2c, and is sent to both the RT1 and RT2 units 112 and 114. In this mode, neither of the RT units are transmitting and the received signals are routed from antenna 130 to the receivers in both RT units.

EXAMPLE EMBODIMENTS

Example 1 includes an antenna switching system, comprising: an antenna switch module comprising: a switch network that includes a plurality of radio frequency (RF) switches connectable to a signal receive path and a signal transmit path; and a switch control unit in operative communication with the switch network; a first receiver/transmitter unit operatively connected to the antenna switch module; a second receiver/transmitter unit operatively connected to the antenna switch module; and a single antenna operatively connected to the first receiver/transmitter unit and the second receiver/transmitter unit through the antenna switch module; wherein the switch control unit is operative to receive mutual suppression signal pulses routed from the first receiver/transmitter unit and the second receiver/transmitter unit; wherein the mutual suppression signal pulses are decoded by the switch control unit to generate control signals to open and close the RF switches as needed for a signal transmit operation mode or a signal receive operation mode; wherein the signal transmit operation mode comprises: a first transmit mode in which either the first or second receiver/transmitter units is configured to transmit RF signals along the signal transmit path; or a second transmit mode in which both the first and second receiver/transmitter units are configured to transmit RF signals along the signal transmit path.

Example 2 includes the antenna switching system of Example 1, wherein the RF switches comprise: a first set of RF switches including a first RF switch, a second RF switch, and a third RF switch that are each connectable to the signal receive path; and a second set of RF switches including a fourth RF switch and a fifth RF switch that are each connectable to the signal transmit path; wherein at least one of the fourth RF switch and the fifth RF switch are connectable to a dummy load.

Example 3 includes the antenna switching system of Example 2, wherein the first, second, third, and fourth RF switches are single-pole-single-throw (SPST) switches; and the fifth RF switch is a single-pole-double-throw (SPDT) switch.

Example 4 includes the antenna switching system of Examples 2, wherein the first, second, and third RF switches are SPST switches; and the fourth and fifth RF switches are SPDT switches.

Example 5 includes the antenna switching system of any of Examples 2-4, wherein during the first transmit mode: the first receiver/transmitter unit transmits an RF signal along the signal transmit path to the antenna through the fourth RF switch that is connected to the signal transmit path; or the second receiver/transmitter unit transmits an RF signal along the signal transmit path to the antenna through the fifth RF switch that is connected to the signal transmit path.

Example 6 includes the antenna switching system of Example 2, wherein during the second transmit mode, in which both the first and second receiver/transmitter units are configured to transmit RF signals along the signal transmit path, the RF signal from one of the first or second receiver/transmitter units is routed to the dummy load.

Example 7 includes the antenna switching system of Example 1, wherein the RF switches comprise: a first RF switch and a second RF switch that are each connectable to the signal receive path; a third RF switch that is connectable to the signal receive path and the signal transmit path; and a fourth RF switch and a fifth RF switch that are each connectable to the signal transmit path; wherein the fourth RF switch and the fifth RF switch are each connectable to a respective dummy load.

Example 8 includes the antenna switching system of Example 7, wherein: the first and second RF switches are SPST switches; the third RF switch is a single-pole-three-throw (SPTT) switch; and the fourth and fifth RF switches are SPDT switches.

Example 9 includes the antenna switching system of any of Examples 7-8, wherein during the first transmit mode: the first receiver/transmitter unit transmits an RF signal along the signal transmit path to the antenna through the fourth RF switch and the third RF switch that are connected to the signal transmit path; or the second receiver/transmitter unit transmits an RF signal along the signal transmit path to the antenna through the fifth RF switch and the third RF switch that are connected to the signal transmit path.

Example 10 includes the antenna switching system of any of Examples 7-8, wherein during the second transmit mode, in which both the first and second receiver/transmitter units are configured to transmit RF signals along the signal transmit path, the RF signal from one of the first or second receiver/transmitter units is routed to the respective dummy load.

Example 11 includes the antenna switching system of Example 1, wherein the RF switches comprise: a first RF switch connectable to the signal receive path, the signal transmit path, and a first dummy load; a second RF switch connectable to the signal receive path, the signal transmit path, and a second dummy load; and a third RF switch connectable to the signal receive path.

Example 12 includes the antenna switching system of Example 11, wherein: the first and second RF switches are SPTT switches; and the third RF switch is a SPST switch.

Example 13 includes the antenna switching system of any of Examples 11-12, wherein during the first transmit mode: the first receiver/transmitter unit transmits an RF signal along the signal transmit path to the antenna through the first RF switch that is connected to the signal transmit path; or the second receiver/transmitter unit transmits an RF signal along the signal transmit path to the antenna through the second RF switch that is connected to the signal transmit path.

Example 14 includes the antenna switching system of any of Examples 11-12, wherein during the second transmit mode, in which both the first and second receiver/transmitter units are configured to transmit RF signals along the signal transmit path, the RF signal from one of the first or second receiver/transmitter units is respectively routed to one of the first or second dummy loads.

Example 15 includes the antenna switching system of any of Examples 1-14, further comprising a power splitter in the antenna switch module and located along the signal receive path.

Example 16 includes the antenna switching system of any of Examples 1-15, further comprising a low noise amplifier in the antenna switch module and located along the signal receive path, the low noise amplifier configured to receive an RF signal from the antenna.

Example 17 includes the antenna switching system of Example 16, wherein the power splitter is coupled to an output of the low noise amplifier.

Example 18 includes the antenna switching system of Example 17, wherein during the signal receive operation mode, the RF signal from the antenna is amplified by the low noise amplifier, is split into two paths by the power splitter, and is sent to the first and second receiver/transmitter units.

Example 19 includes the antenna switching system of any of Examples 1-18, wherein the first and second receiver/transmitter units are L-band receiver/transmitter units.

Example 20 includes the antenna switching system of any of Examples 1-19, wherein the antenna switch module comprises a line replaceable unit (LRU) that is onboard an aircraft.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An antenna switching system, comprising:
an antenna switch module comprising:
a switch network that includes a plurality of radio frequency (RF) switches connectable to a signal receive path and a signal transmit path; and
a switch control unit in operative communication with the switch network;
wherein the RF switches comprise:
a first set of RF switches including a first RF switch, a second RF switch, and a third RF switch that are each connectable to the signal receive path; and
a second set of RF switches including a fourth RF switch and a fifth RF switch that are each connectable to the signal transmit path;
wherein at least one of the fourth RF switch and the fifth RF switch are connectable to a dummy load;
a first receiver/transmitter unit operatively connected to the antenna switch module;
a second receiver/transmitter unit operatively connected to the antenna switch module; and
a single antenna operatively connected to the first receiver/transmitter unit and the second receiver/transmitter unit through the antenna switch module;
wherein the switch control unit is operative to receive mutual suppression signal pulses routed from the first receiver/transmitter unit and the second receiver/transmitter unit;
wherein the mutual suppression signal pulses are decoded by the switch control unit to generate control signals to open and close the RF switches as needed for a signal transmit operation mode and a signal receive operation mode;
wherein the signal transmit operation mode comprises:
a first transmit mode in which either the first or second receiver/transmitter units is configured to transmit RF signals along the signal transmit path; and
a second transmit mode in which both the first and second receiver/transmitter units are configured to transmit RF signals along the signal transmit path.

2. The antenna switching system of claim 1, wherein:
the first, second, third, and fourth RF switches are single-pole-single-throw (SPST) switches; and
the fifth RF switch is a single-pole-double-throw (SPDT) switch.

3. The antenna switching system of claim 1, wherein:
the first, second, and third RF switches are SPST switches; and
the fourth and fifth RF switches are SPDT switches.

4. The antenna switching system of claim 1, wherein during the first transmit mode:
the first receiver/transmitter unit transmits an RF signal along the signal transmit path to the antenna through the fourth RF switch that is connected to the signal transmit path; or
the second receiver/transmitter unit transmits an RF signal along the signal transmit path to the antenna through the fifth RF switch that is connected to the signal transmit path.

5. The antenna switching system of claim 2, wherein during the second transmit mode, in which both the first and second receiver/transmitter units are configured to transmit RF signals along the signal transmit path, the RF signal from one of the first or second receiver/transmitter units is routed to the dummy load.

6. The antenna switching system of claim 1, further comprising a power splitter in the antenna switch module and located along the signal receive path.

7. The antenna switching system of claim 6, further comprising a low noise amplifier in the antenna switch module and located along the signal receive path, the low noise amplifier configured to receive an RF signal from the antenna.

8. The antenna switching system of claim 7, wherein the power splitter is coupled to an output of the low noise amplifier.

9. The antenna switching system of claim 8, wherein during the signal receive operation mode, the RF signal from the antenna is amplified by the low noise amplifier, is split into two paths by the power splitter, and is sent to the first and second receiver/transmitter units.

10. The antenna switching system of claim 1, wherein the first and second receiver/transmitter units are L-band receiver/transmitter units.

11. The antenna switching system of claim 1, wherein the antenna switch module comprises a line replaceable unit (LRU) that is onboard an aircraft.

12. An antenna switching system, comprising:
an antenna switch module comprising:
a switch network that includes a plurality of radio frequency (RF) switches connectable to a signal receive path and a signal transmit path; and
a switch control unit in operative communication with the switch network;
wherein the RF switches comprise:
a first RF switch and a second RF switch that are each connectable to the signal receive path;
a third RF switch that is connectable to the signal receive path and the signal transmit path; and
a fourth RF switch and a fifth RF switch that are each connectable to the signal transmit path;
wherein the fourth RF switch and the fifth RF switch are each connectable to a respective dummy load;
a first receiver/transmitter unit operatively connected to the antenna switch module;
a second receiver/transmitter unit operatively connected to the antenna switch module; and
a single antenna operatively connected to the first receiver/transmitter unit and the second receiver/transmitter unit through the antenna switch module;
wherein the switch control unit is operative to receive mutual suppression signal pulses routed from the first receiver/transmitter unit and the second receiver/transmitter unit;
wherein the mutual suppression signal pulses are decoded by the switch control unit to generate control signals to open and close the RF switches as needed for a signal transmit operation mode and a signal receive operation mode;
wherein the signal transmit operation mode comprises:
a first transmit mode in which either the first or second receiver/transmitter units is configured to transmit RF signals along the signal transmit path; and
a second transmit mode in which both the first and second receiver/transmitter units are configured to transmit RF signals along the signal transmit path.

13. The antenna switching system of claim 12, wherein:
the first and second RF switches are SPST switches;
the third RF switch is a single-pole-three-throw (SPTT) switch; and
the fourth and fifth RF switches are SPDT switches.

14. The antenna switching system of claim 12, wherein during the first transmit mode:
the first receiver/transmitter unit transmits an RF signal along the signal transmit path to the antenna through the fourth RF switch and the third RF switch that are connected to the signal transmit path; or
the second receiver/transmitter unit transmits an RF signal along the signal transmit path to the antenna through the fifth RF switch and the third RF switch that are connected to the signal transmit path.

15. The antenna switching system of claim 12, wherein during the second transmit mode, in which both the first and second receiver/transmitter units are configured to transmit RF signals along the signal transmit path, the RF signal from one of the first or second receiver/transmitter units is routed to the respective dummy load.

16. An antenna switching system, comprising:
an antenna switch module comprising:
a switch network that includes a plurality of radio frequency (RF) switches connectable to a signal receive path and a signal transmit path; and
a switch control unit in operative communication with the switch network; wherein the RF switches comprise:
a first RF switch connectable to the signal receive path, the signal transmit path, and a first dummy load;
a second RF switch connectable to the signal receive path, the signal transmit path, and a second dummy load; and
a third RF switch connectable to the signal receive path;
a first receiver/transmitter unit operatively connected to the antenna switch module;
a second receiver/transmitter unit operatively connected to the antenna switch module; and
a single antenna operatively connected to the first receiver/transmitter unit and the second receiver/transmitter unit through the antenna switch module;
wherein the switch control unit is operative to receive mutual suppression signal pulses routed from the first receiver/transmitter unit and the second receiver/transmitter unit;
wherein the mutual suppression signal pulses are decoded by the switch control unit to generate control signals to open and close the RF switches as needed for a signal transmit operation mode and a signal receive operation mode;
wherein the signal transmit operation mode comprises:
a first transmit mode in which either the first or second receiver/transmitter units is configured to transmit RF signals along the signal transmit path; and
a second transmit mode in which both the first and second receiver/transmitter units are configured to transmit RF signals along the signal transmit path.

17. The antenna switching system of claim 16, wherein:
the first and second RF switches are SPTT switches; and
the third RF switch is a SPST switch.

18. The antenna switching system of claim 16, wherein during the first transmit mode:
the first receiver/transmitter unit transmits an RF signal along the signal transmit path to the antenna through the first RF switch that is connected to the signal transmit path; or
the second receiver/transmitter unit transmits an RF signal along the signal transmit path to the antenna through the second RF switch that is connected to the signal transmit path.

19. The antenna switching system of claim 16, wherein during the second transmit mode, in which both the first and second receiver/transmitter units are configured to transmit RF signals along the signal transmit path, the RF signal from one of the first or second receiver/transmitter units is respectively routed to one of the first or second dummy loads.

\* \* \* \* \*

UNITED STATES PATENT AND TRADEMARK OFFICE
CERTIFICATE OF CORRECTION

PATENT NO. : 10,720,954 B2
APPLICATION NO. : 16/359274
DATED : July 21, 2020
INVENTOR(S) : Robert S. Doyle and Steven D. Neuharth Page 1 of 1

It is certified that error appears in the above-identified patent and that said Letters Patent is hereby corrected as shown below:

In the Claims

At Column 9, Claim 5, Line 62, please replace "antenna switching system of claim 2," with --antenna switching system of claim 1--

Signed and Sealed this
Thirteenth Day of October, 2020

Andrei Iancu
*Director of the United States Patent and Trademark Office*